US008149927B2

(12) United States Patent
Kim et al.

(10) Patent No.: US 8,149,927 B2
(45) Date of Patent: Apr. 3, 2012

(54) METHOD OF AND APPARATUS FOR ENCODING/DECODING DIGITAL SIGNAL USING LINEAR QUANTIZATION BY SECTIONS

(75) Inventors: Junghoe Kim, Seoul (KR); Dohyung Kim, Hwaseong-si (KR); Shihwa Lee, Seoul (KR); Sangwook Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/792,048

(22) Filed: Jun. 2, 2010

(65) Prior Publication Data

US 2010/0239027 A1 Sep. 23, 2010

Related U.S. Application Data

(62) Division of application No. 11/125,076, filed on May 10, 2005.

(30) Foreign Application Priority Data

May 12, 2004 (KR) ........................ 10-2004-0033614

(51) Int. Cl.
*H04B 14/04* (2006.01)

(52) U.S. Cl. ................... 375/243; 375/240.03; 704/222; 704/230

(58) Field of Classification Search .................. 375/243, 375/240.03; 704/222, 230
See application file for complete search history.

(56) References Cited

U.S. PATENT DOCUMENTS

| | | | | |
|---|---|---|---|---|
| 5,675,703 | A | 10/1997 | Sato | |
| 5,852,805 | A | 12/1998 | Hiratsuka et al. | |
| 6,061,649 | A * | 5/2000 | Oikawa et al. | 704/226 |
| 6,295,009 | B1 * | 9/2001 | Goto | 341/50 |
| 6,349,284 | B1 * | 2/2002 | Park et al. | 704/500 |
| 6,388,588 | B2 | 5/2002 | Kitamura | |
| 2002/0004718 | A1 | 1/2002 | Hasegawa et al. | |

FOREIGN PATENT DOCUMENTS

JP 7-281697 10/1995

(Continued)

OTHER PUBLICATIONS

Saito, H. et al., *Subadaptive Piecewise Linear Quantization for Speech Signal (64 kbits/s) Compression*, IEEE Transactions on Speech and Audio Processing. vol. 4, No. 5, pp. 379-382, Sep. 1996.

(Continued)

*Primary Examiner* — Ted Wang
(74) *Attorney, Agent, or Firm* — Staas & Halsey LLP

(57) ABSTRACT

A method of encoding/decoding a digital signal using linear quantization by sections, and an apparatus for the same are provided. The method of encoding includes: converting a digital input signal, and removing redundant information from the digital signal; allocating a number of bits allocated to each predetermined quantized unit considering the importance of the digital signal; dividing the distribution of signal values into predetermined sections based on the predetermined quantized units, and linear quantizing data converted pin the operation of converting the digital input signal by sections; and generating a bit stream from the linear quantized data and predetermined side information. Therefore, a sound quality is improved compared to a sound quality produced by conventional linear quantizing devices and a complexity of a non-linear quantizing device is reduced.

19 Claims, 6 Drawing Sheets

FOREIGN PATENT DOCUMENTS

| | | |
|---|---|---|
| JP | 8-102677 | 4/1996 |
| JP | 08-307281 | 11/1996 |
| JP | 09-230894 | 9/1997 |
| JP | 11-145846 | 5/1999 |
| JP | 2000-78018 | 3/2000 |
| JP | 2002-23799 | 1/2002 |
| JP | 2002-311997 | 10/2002 |
| KR | 2002-0077959 | 10/2002 |

OTHER PUBLICATIONS

Final Rejection, mailed Jan. 18, 2011, in corresponding Japanese Application No. 2005-138022 (4 pp.).

Karlheinz Brandenburg, et al., "ISO-MPEG-1 Audio: A Generic Standard for Coding of High-Quality Digital Audio", $92^{nd}$ Convention of the Audio Engineering Society, Vienna, Austria, Mar. 24-27, 1992, pp. 780-792.

Japanese Office Action issued on Jun. 29, 2010 in corresponding Japanese Patent Application No. 2005-138022.

European Summons to Attend Oral Proceedings issued on Jul. 16, 2010.

U.S. Notice of Allowance mailed Jan. 24, 2011 in parent U.S. Appl. No. 11/125,076.

Saito, H. et al., *Subadaptive Piecewise Linear Quantization for Speech Signal*(64 kbits/s) *Compression*, IEEE Transactions on Speech and Audio Processing. vol. 4, No. 5, pp. 379-382. Sep. 1996.

Notice to Submit Response, mailed Feb. 28, 2006, in corresponding Korean Application No. 10-2004-0033614 (6 pp.).

Communication of the European Search Report, mailed May 4, 2009, in corresponding European Application No. 05252931.0 (2 pp.).

Communication Pursuant to Article 94(3) EPC, mailed Nov. 20, 2009, in corresponding European Application No. 05252931.0.

Office Action, mailed Dec. 5, 2008, in corresponding U.S. Appl. No. 11/125,076 (8 pp.).

Office Action, mailed Jun. 8, 2009, in corresponding U.S. Appl. No. 11/125,076 (5 pp.).

Office Action, mailed Sep. 1, 2009, in corresponding U.S. Appl. No. 11/125,076 (11 pp.).

Notice of Allowance, mailed Feb. 17, 2010, in corresponding U.S. Appl. No. 11/125,076 (9 pp.).

* cited by examiner

METHOD OF AND APPARATUS FOR ENCODING/DECODING DIGITAL SIGNAL USING LINEAR QUANTIZATION BY SECTIONS

CROSS-REFERENCE TO RELATED APPLICATIONS

This application is a divisional of U.S. Ser. No. 11/125,076, filed May 10, 2005, the disclosure of which is incorporated herein in its entirety by reference. This application claims the benefit of Korean Patent Application No. 2004-33614, filed on May 12, 2004, in the Korean Intellectual Property Office, the disclosure of which is incorporated herein in its entirety by reference.

BACKGROUND OF THE INVENTION

1. Field of the Invention

The present invention relates to encoding/decoding a digital signal, and, more particularly, to a method of and an apparatus of encoding/decoding a digital signal using linear quantization by sections.

2. Description of the Related Art

A waveform including information is an analog signal in which amplitude of the waveform changes continuously over time. Therefore, an analog-to-digital (A/D) conversion is needed in order to express the waveform as a discrete signal. Two processes are required to perform the A/D conversion. The first is a sampling process in which the amplitude of the analog signal is sampled, and the other is an amplitude quantizing process in which the sampled amplitudes are replaced with the nearest value that is used by a device in reproducing a digital signal. That is, in the amplitude quantizing process, an input amplitude x(n) is converted into y(n), which is an element included in a finite collection of amplitudes, in time n.

When storing/restoring audio signals, according to a recent development in digital signal processing technology, a conventional audio signal is converted into a pulse code modulation (PCM) data signal, which is a digital signal, after a sampling and quantizing operation, and is stored in a recording/storing medium such as a compact disc (CD) or a digital audio tape (DAT). Then, the stored signal is reproduced and listened to again according to the needs of a user. Such storing/restoring of audio signals is widely known and used by the general public. The storing/restoring method using the PCM data improves sound quality and overcomes the problem of deterioration, which occurs according to the storage period, compared to an analog method used in for example, long-play record (LP) or a tape. However, the large size of digital data subsequently has brought about problems of storage and transmission.

To solve such problems, methods such as differential pulse code modulation (DPCM) and adaptive differential pulse code modulation (ADPCM) have been developed to condense digital audio signals. There have been efforts to decrease the amount of data in digital audio signals using such methods, but there are large variations in the efficiency of the digital audio signals depending on the types of the signals. Recently, a method of decreasing data using a psychoacoustic model of humans is being used in a moving pictures experts group (MPEG)/audio technique standardized by the International Standard Organization (ISO) and an alternating current (AC)-2/AC-3 technique developed by Dolby. These methods play a big role in efficiently decreasing the amount of data while maintaining the characteristics of signals.

In a conventional audio signal condensing technique, for example, MPEG-1/audio, MPEG-2/audio, or AC-2/AC-3, signals in the time domain are grouped into blocks of a predetermined size and converted into signals in the frequency domain. Then, scalar quantization is performed on the converted signals using the psychoacoustic model. The scalar quantization technique is simple, but scalar quantization is not the most suitable choice even if an input sample is statistically independent. Of course, scalar quantization is even more unsuitable if an input sample is statistically dependent. Therefore, no-loss encoding (e.g. entropy encoding) or encoding including some type of quantization adjustment is performed. Consequently, the condensing technique is quite complicated compared to the method of storing simple PCM data. Also, a configured bit stream includes side information to condense signals in addition to quantized PCM data.

The MPEG/audio standard or the AC-2/AC-3 method provides virtually the same sound quality as a CD with a bit ratio of 64-384 Kbps, which is 1/6 to 1/8 less than a bit radio used in the conventional digital encoding method. As such, the MPEG/audio standard is predicted to be a standard that will play an important role in storing and transmission of audio signals in, for example, digital audio broadcasting (DAB), Internet phones, audio on demand (AOD), and multimedia systems.

In the MPEG-1/2 audio encoding technology, after performing a subband filtering operation, a subband sample is linearly quantized using bit allocated information that is suggested in the psychoacoustic model, and completes the encoding using a bit packing process. In the quantizing process, a linear quantizing device provides an optimum efficiency when distribution of data is uniform. However, the actual distribution of data is not uniform, but is closer to a Gaussian or Laplacian distribution. In this case, a quantizing device is designed to fit each distribution, and an optimum result may be achieved by minimizing in a mean squared error (MSE).

A general audio encoder such as an advanced audio coder (AAC) of MPEG-2/4 uses a nonlinear quantizing device of $X^{4/3}$. The AAC is designed in consideration of a sample distribution of a modified discrete cosine transform (MDCT) and the psychoacoustic perspective. However, the encoder is highly complex due to the characteristics of a nonlinear quantizing device. Therefore, the AAC generally cannot be used as an audio encoder that requires low complexity.

SUMMARY OF THE INVENTION

An aspect of the present invention provides a method of and an apparatus to encode a digital signal using linear quantization by sections that provides better sound quality than a general linear quantizing device by considering the distribution of digital data, and which simplifies the complexity of a quantizing device in a nonlinear quantizing device.

An aspect of the present invention provides a method of and an apparatus to decode a digital signal using linear quantization by sections that provides better sound quality than a general linear quantizing device by considering the distribution of digital data, and which simplifies the complexity of a quantizing device in a nonlinear quantizing device.

According to an aspect of the present invention, there is provided a method of encoding a digital signal using linear quantization by sections. The method includes: converting a digital input signal, and removing redundant information from the digital signal; allocating a number of bits allocated to each predetermined quantized unit considering the importance of the digital signal; dividing the distribution of signal values into predetermined sections based on the predetermined quantized units, and linear quantizing data converted in the operation of converting the digital input signal by sections; and generating a bit stream from the linear quantized data and predetermined side information. The dividing of the distribution of signal values and linear quantizing of the data may include: normalizing the data converted in the operation of converting the digital input signal using a predetermined scale factor based on the quantizing unit; dividing a range of normalized values into predetermined sections, and converting the normalized data at the operation of the normalizing of the data using a linear function set for each of the sections; scaling a value converted in the operation of converting the normalized data using the number of bits allocated in the operation of calculating the number of bits; and calculating a qunatized value by rounding the scaled value in the operation of scaling the value. The scaling factor may be an integer determined by a predetermined function of a value greater or equal to an absolute maximum value after calculating the absolute maximum value among sample data values within the quantizing unit. The linear function used in the dividing of the range of normalized values may be expressed as a plurality of independent linear functions for each section. The dividing of the range of normalized values and the converting of the normalized data may include: dividing the range of normalized values into two sections; and converting the normalized data by applying a linear function set for each of the sections to the data. The linear functions are $$y = \frac{ax}{(a-2b)} \text{ and } y = \frac{x}{(1+2b)} + \frac{2b}{(1+2b)}$$

(here, a denotes the range of normalized values, and b denotes a section displacement from the center of a). The linear function may be continuous. The converting of the analog signal may be performed by one of a discrete cosine transform, a fast Fourier transform, a modified discrete cosine transform, and a subband filter.

According to another aspect of the present invention, there is provided an apparatus to encode a digital signal using linear quantization by sections. The apparatus includes: a data converting unit to convert a digital signal and remove redundant information from the corrected digital signal; a bit allocating unit to calculate the number of bits allocated to each predetermined quantizing unit considering the importance of the analog signal; a linear quantizing unit to divide the distribution of data values into predetermined sections based on the predetermined quantizing units and linear quantizing data converted at the data converting unit; and a bit packing unit to generate a bit stream including the linear quantized data generated by the linear quantizing unit and predetermined side information. The linear quantizing unit may include: a data normalizing unit to normalize the data converted at the data converting unit using a predetermined scaling factor; a section quantizing unit to divide a range of normalized values into predetermined sections, and apply a linear quantizing function set for each of the sections to the normalized data; a scaling unit to scale values generated by the section quantizing unit using the number of bits allocated by the bit allocation unit; and a rounding unit to generate a quantized value by rounding the scaled value based on the number of allocated bits.

According to another aspect of the present invention, there is provided a method of decoding a digital signal using linear quantization by sections. The method includes: extracting quantized data and side information from a bit stream; dequantizing the linear quantized data by sections corresponding to sections set for quantization using the side information; and generating a digital signal from the dequnatized data using an inverse of a conversion used for decoding. The dequantizing of data linear quantized by sections may include: inverse scaling the data linear quantized by sections using bit allocation information, the inverse scaling corresponding to scaling used for quantization; linear dequantizing the inverse scaled data by sections; and denormalizing the inverse scaled data using an inverse scaling factor that corresponds to a scaling factor used for quantization.

According to another aspect of the present invention, there is provided an apparatus to decode a digital signal using linear quantization by sections. The apparatus includes: a bit stream interpreting unit to extract quantized data and side information from a bit stream of a digital signal; a linear dequantizing unit to dequantize linear quantized data by sections corresponding to sections set for quantization using the side information extracted by the bit stream interpreting unit; and a digital signal generating unit to generate dequantized data at the linear dequantizing unit as a digital signal using the inverse of a conversion used for dequantization. The linear dequantizing unit may include: an inverse scaling unit to inverse scale the data linear quantized by sections using bit allocation information included in the side information of the bit stream interpreting unit, the inverse scaling corresponding to scaling used for quantization; a section linear dequantizing unit to linear dequantize the inverse scaled data by sections; and a denormalizing unit to denormalize the dequnatized data using an inverse scaling factor that corresponds to a scaling factor used for quantization.

According to another aspect of the present invention, there is provided a computer readable recording medium storing a program to execute the any one of the methods described above.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
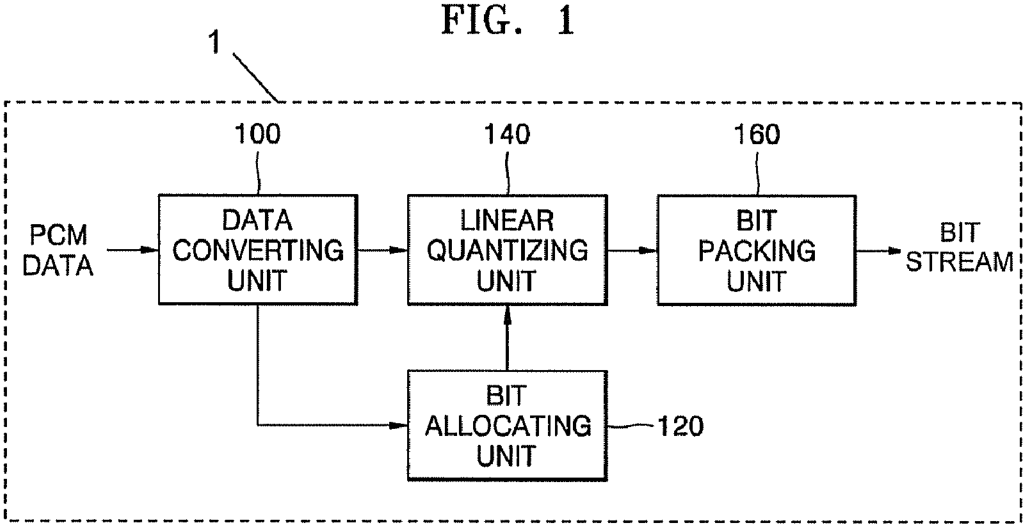
FIG. 1 is a block diagram of an apparatus to encode a digital signal using linear quantization by sections according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus 1 to encode a digital signal using linear quantization by sections according to an embodiment of the present invention. The apparatus 1 to encode a digital signal includes a data converting unit 100, a bit allocating unit 120, a linear quantizing unit 140, and a bit packing unit 160.

The data converting unit 100 converts an analog signal into a digital signal, and removes redundant information from data. The digital signal may be a pulse control modulation (PCM) audio signal, and in this case, the data converting unit 100 converts the PCM audio signal into a digital signal and removes redundant information from sampled data. In the conversion of the PCM audio signal, redundant information in data may be removed using a subband filter, a discrete cosine transform (DCT), a modified discrete cosine transform (MDCT), a fast Fourier transform (FFT), etc.

The bit allocating unit 120 calculates a bit allocation amount to represent the number of bits that are allocated to each predetermined quantizing unit in consideration of the importance of data in each predetermined quantized unit relative to the digital signal. In addition, the bit allocating unit 120 omits detailed information with low sensitivity using hearing characteristics of humans and sets the bit allocation amount differently for each frequency so as to reduce the encoding amount. Further, the bit allocating unit 120 may calculate bit allocation information considering a psychoacoustic perspective. The quantizing unit may be a subband when using a subband filter, and a scale factor band when using an ACC.

The linear quantizing unit 140 divides the distribution of sample data values into predetermined sections based on the bit allocation amount of each of the quantized units, and linearly quantizes sampling data with the redundant information that was removed by the data converting unit 100. The linear quantizing unit 140 will be described in more detail below.

The bit packing unit 160 codes and packs the data that is linear quantized by the linear quantizing unit 140 along with predetermined side information, and generates a bit stream. The coding may be no-loss encoding, and may use a Huffman coding or any other similar algorithm.

Figure 2:
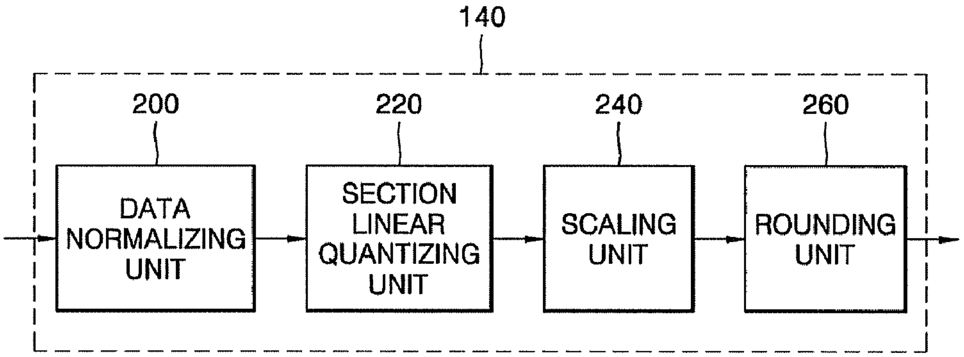
FIG. 2 is a block diagram of a linear quantizing unit illustrated in FIG. 1.

FIG. 2 is a block diagram of the linear quantizing unit 140. The linear quantizing unit 140 includes a data normalizing unit 200, a section linear quantizing unit 220, a scaling unit 240, and a rounding unit 260.

The data normalizing unit 200 normalizes the sample data converted by the data converting unit 100 using a predetermined scale factor. The scale factor is an integer determined by a predetermined function of a value that is greater than or equal to a maximum absolute value after calculating the maximum absolute value among sample data values within the quantizing unit.

The section linear quantizing unit 220 divides the range of normalized values into predetermined sections, and applies linear functions to the data that is normalized by the data normalizing unit 200 according to the predetermined sections.

The scaling unit 240 scales the values that are generated by the section linear quantizing unit 220 using the number of bits allocated by the bit allocating unit 120.

The rounding unit 260 rounds the scaled sampling values to the nearest whole number using the number of bits that are allocated and generates quantized sample data.

Figure 3:
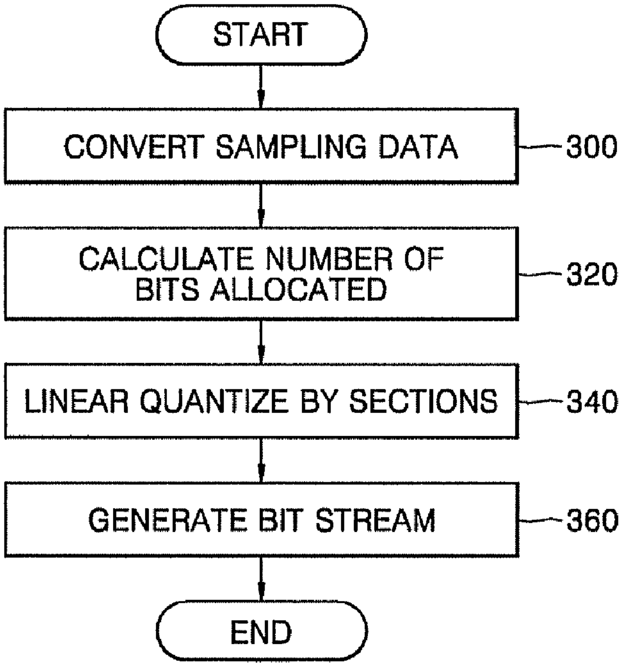
FIG. 3 is a flow chart illustrating a method of encoding a digital signal using linear quantization by sections according to an embodiment of the present invention.

FIG. 3 is a flow chart illustrating a method of encoding a digital signal using linear quantization by sections according to an embodiment of the present invention. Referring to FIG. 3, when the data converting unit 100 receives a PCM audio signal, the PCM audio signal is converted into a digital signal and redundant information among sampled data is removed (operation 300). The removal of the redundant information is performed by subband filtering. Here, only data that corresponds to a frequency of the subband is passed, and the rest is removed.

Then, the bit allocating unit 120 calculates the number of bits that are allocated to each predetermined quantizing unit in consideration of the importance of the audio signal (operation 320). For example, the number of bits allocated to each subband is calculated when using the subband filter. The importance of the audio signal is decided by a consideration of a psychoacoustic perspective that is based on hearing characteristics of humans. Therefore, more bits are allocated to frequencies to which humans are highly sensitive.

The distribution of audio data values is divided into predetermined sections based on the predetermined quantizing units, for example, each subband when using the subband filter, and the sample data that is divided into sections is linear quantized (operation 340). Operation 340 will described in more detail later. The linear quantized sample data and the predetermined side information are generated as a bit stream (operation 360).

Figure 4:
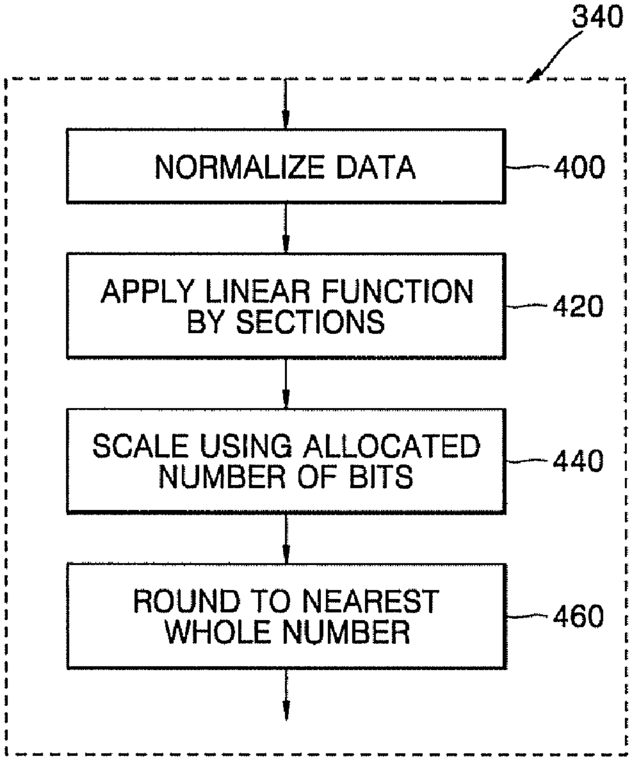
FIG. 4 is a flow chart illustrating linear quantizing by sections.

FIG. 4 is a flow chart to illustrate the above-described linear quantizing by sections. First, the sample data that is converted by the data converting unit 100 is normalized by the data normalizing unit 200 using a predetermined scale factor based on quantizing units (i.e., based on subbands when using the subband filter) (operation 400).

For example, in an embodiment of the invention the output sample values that are subband filtered using the subband filter of the data converting unit 100 may be 24, −32, 4, and 10. In this case, the maximum absolute value of the output sample values is 32. When the sample values are normalized using a scale factor corresponding to the maximum value 32, the sample values become 0.75, −1, 0.125, and 0.3125. Here, the scale factor may be determined as follows. In a predetermined formula $2^{x/4}$, wherein x is a scale factor, when x is incremented by one from 0 to 31, the value of the formula $2^{x/4}$ is determined according to 32 values of x. That is, if x=0, the value of the formula $2^{x/4}$ is 1, if x=1, the value of the formula $2^{x/4}$ is 1.18, if x=2, the value of the formula $2^{x/4}$ is 1.414, if x=3, the value of the formula $2^{x/4}$ is 1.68, if x=4, the value of the formula $2^{x/4}$ is 2, etc. When all the values of the formula $2^{x/4}$ are calculated, it may be seen that, as x increments by one, the value of the formula $2^{x/4}$ changes in increments of 1.5 dB. In the present example, if the value of the formula $2^{x/4}$ corresponding to the absolute maximum value 32 is 32, the scale factor x will be 20. Therefore, one value of the scale factor is determined in each subband.

Figure 5:
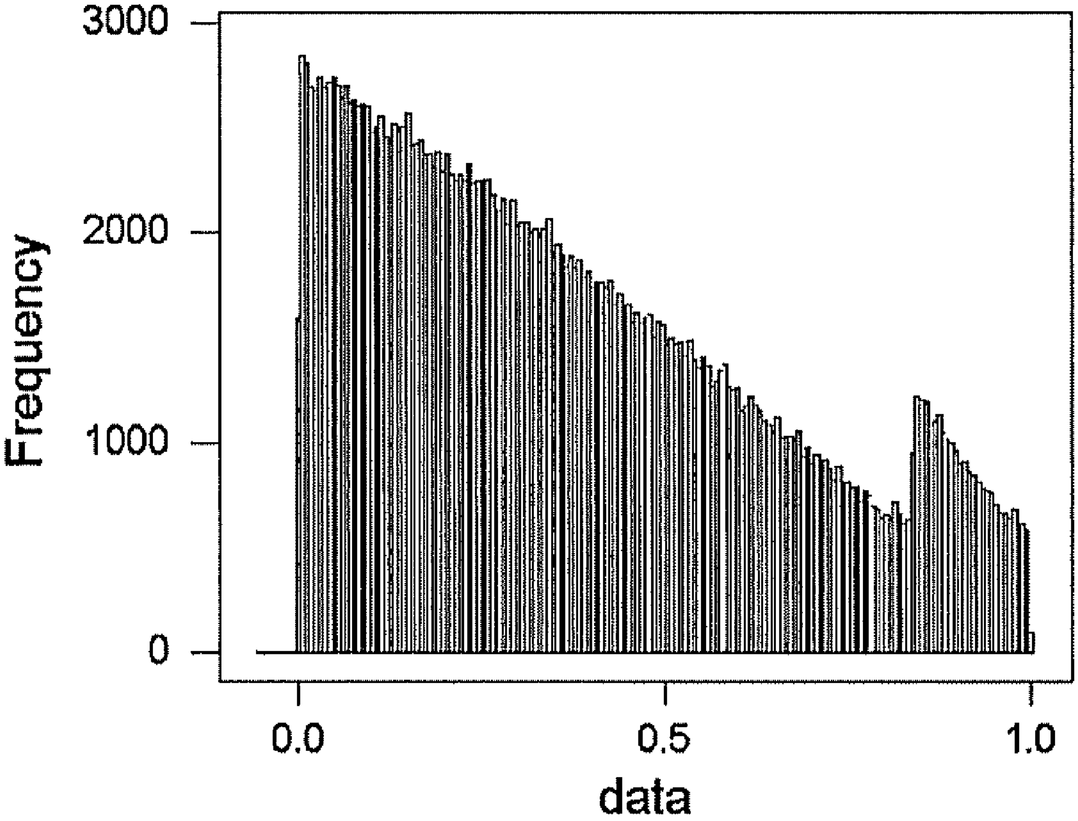
FIG. 5 is a graph illustrating the distribution of subband samples used to normalize sample data.

FIG. 5 is a graph illustrating the distribution of subband samples used to normalize the sample data. The normalized samples, as shown in FIG. 5, are not uniformly distributed. Thus, they cannot be optimally quantized using a linear quantizing device.

Figure 6:
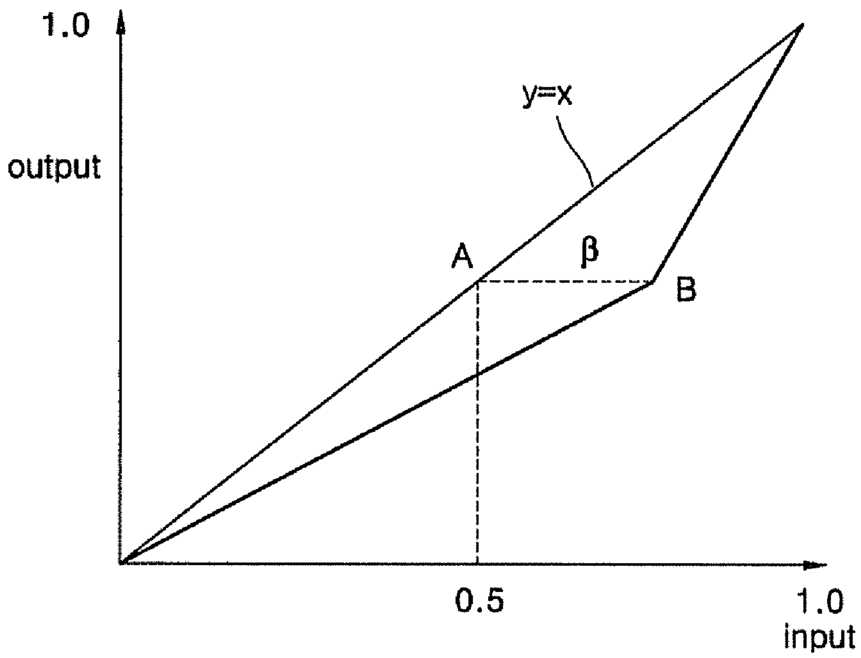
FIG. 6 is a view of diving the range of a normalized value into two sections.

Therefore, the range of the normalized values is divided into predetermined sections by the section quantizing unit 220, and the sample data that is normalized in operation 400 is converted by applying the linear function set by predetermined sections to the sample data (operation 420). For example, the range of the normalized values in FIG. 5 is 0.0-1.0, and FIG. 6 illustrates the range of the normalized value divided into two sections. In FIG. 6, if a linear graph given by y=x is assumed to be divided at a point B, the point B may be obtained by shifting a distance β along the x-axis from a point A at the mid point (x=0.5) of the graph y=x. Thus, if β is 0.1, the x-axis is divided into two sections: one section from 0-0.6 (section 1) and the other section from 0.06 to 1.0 (section 2). Each of the two sections includes a linear function. β may be set according to the distribution of samples. β indicates how much out of range the point B is from the middle of the range of the normalized value along the x-axis. According to another embodiment of the invention, β may indicate a degree of a slant from the point A with respect to the y-axis.

The linear functions may generally be expressed as $$y = \frac{ax}{(a-2b)} \text{ and } y = \frac{x}{(1+2b)} + \frac{2b}{(1+2b)}.$$

Here, a denotes the range of normalized values, and b denotes section displacement from the center of a. In the present example, if the β is 0.1, a first linear function $y=f_1(x)$ is $$y = \frac{5}{6} \times x$$

in section 1, and a second linear function $y=f_2(x)$ is $$y = \frac{5}{4} \times x - \frac{1}{4}$$

in section 2. The linear functions are applied to sample values in the corresponding sections. In the present example, the sample values 0.125 and 0.3125 included in section 1 are mapped by applying the first linear function $y=f_1(x)$, and the sample values 0.75 and −1 included in section 2 are mapped by applying the second linear function $y=J'_2(x)$.

The values that are mapped by the scaling unit 240 are scaled using the number of bits that are allocated by the bit allocating unit 120 (operation 440). For example, if 3 bits are allocated to each mapped value, the sample values mapped by applying the linear functions of the corresponding sections are multiplied by 8, since the values 0-7 are possible with 3 bits.

The sample values that are scaled in operation 440 are rounded so as to obtain quantized sample values (operation 460). The rounded value is substantially always an integer. For example, if bit allocating information is 3, a rounded value is an integer from 0 to 7, is expressed with 3 bits, and is the final quantized sample value.

Figure 7:
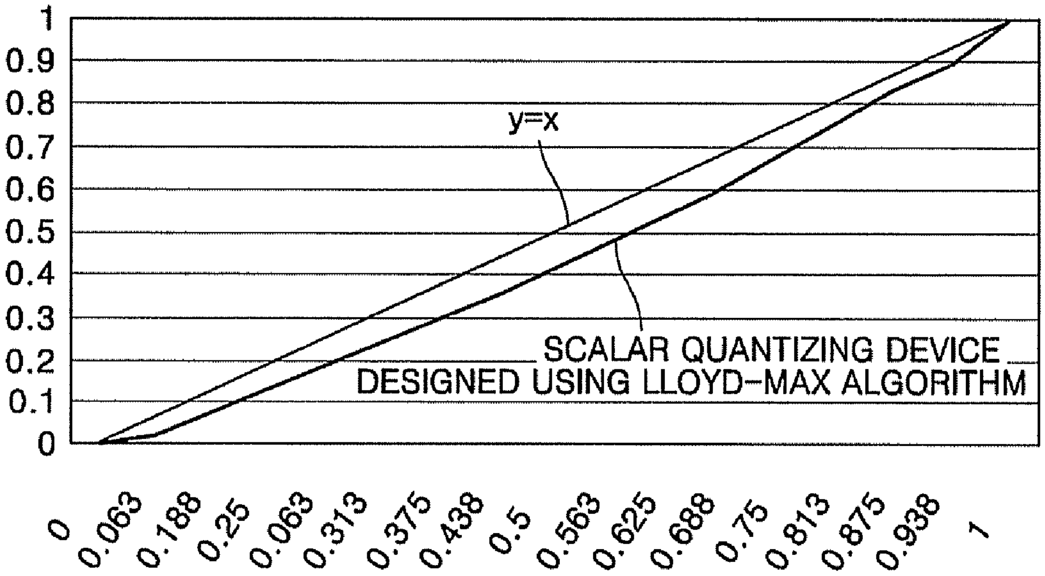
FIG. 7 is a graph produced using a quantizing device designed according to a Lloyd-Max algorithm using the distribution of FIG. 5.

FIG. 7 is a graph that is produced using a quantizing device designed according to a Lloyd-Max algorithm using the distribution produced by the apparatus to encode the digital signal of FIG. 1. The produced graph bulges downwards toward the x-axis from the linear function y=x, as illustrated in FIG. 7.

Next, an apparatus 2 to decode a digital signal and a method of decoding digital signals will be briefly explained, but not in great detail since the decoding of the digital signals is the reverse of the encoding of the digital signals.

Figure 8:
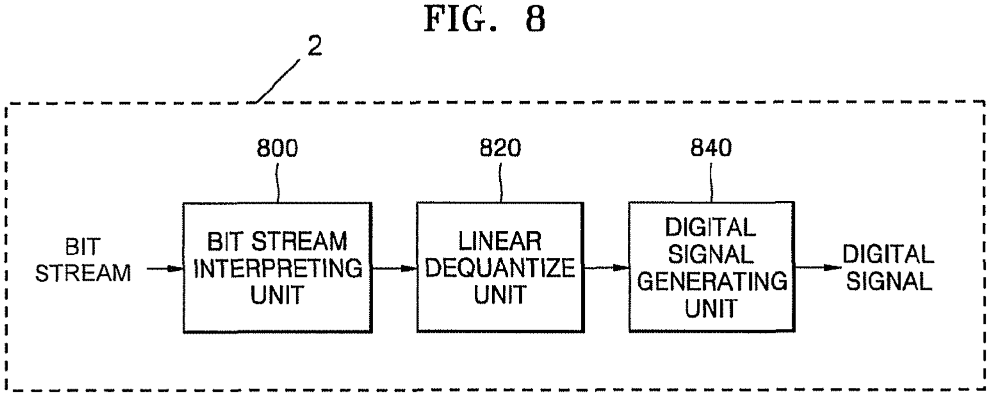
FIG. 8 is a block diagram of an apparatus to decode a digital signal using linear quantization by sections according to an embodiment of the present invention.

FIG. 8 is a block diagram of an apparatus 2 to decode a digital signal according to an embodiment of the present invention. The apparatus 2 to decode a digital signal includes a bit stream interpreting unit 800, a linear dequantizing unit 820, and a digital signal generating unit 840.

The bit stream interpreting unit 800 extracts quantized sample data and side information from a bit stream, such as an audio signal bit stream, in an embodiment of the invention, of a digital signal. The linear dequantizing unit 820 dequantizes the sample data that is linear quantized by sections into corresponding sections that correspond to the sections set during quantization using the side information that is extracted from the bit stream interpreting unit 820. If the sections are divided with respect to the input axis illustrated in FIG. 6 during encoding, then the sections are divided with respect to the output axis during decoding. The digital signal generating unit 840 generates digital signals from the data quantized by the linear dequantizing unit 820, such as PCM data, in an embodiment of the invention, using an inverse conversion of the conversion used for encoding.

Figure 9:
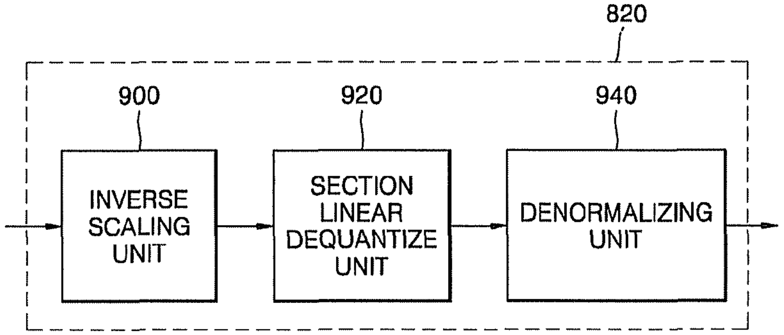
FIG. 9 is a block diagram of a linear quantizing unit.

FIG. 9 is a block diagram of the linear quantizing unit 820. The linear quantizing unit 820 includes an inverse scaling unit 900, a section linear dequantizing unit 920, and a denormalizing unit 940.

The inverse scaling unit 900 inverse scales the sample data that are linear quantized in sections using bit allocation information included in the side information that is extracted by the bit stream interpreting unit 800. The inverse scale corresponds to the scaling used for quantization. For example, if 4 bits are allocated in the encoding operation and the sample data was multiplied by 15, then the sample data is divided by 15 in the decoding operation.

The section linear dequantizing unit 920 linear dequantizes the inverse-scaled data for each section. The denormalizing unit 940 denormalizes the data that is dequantized by the section linear dequantizing unit 920 using an inverse scale factor that corresponds to the scaling factor used in the quantization operation.

Figure 10:
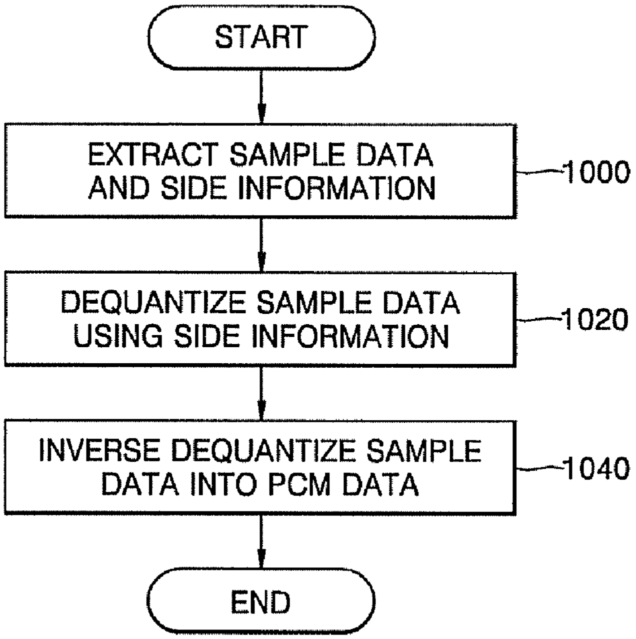
FIG. 10 is a flow chart illustrating a method of decoding a digital signal using linear quantization by sections.

FIG. 10 is a flow chart illustrating a method of decoding a digital signal using linear quantization by sections. Referring to FIG. 10, first, when a bit stream, which may be an audio bit stream, or a digital signal is input to the bit stream interpreting unit 800, quantized sample data and side information are extracted from the audio bit stream (operation 1000).

The linear dequantizing unit 820 dequantizes the sample data that is linear quantized by sections using the side information. The sections correspond to the sections used for quantization (e.g., if the sections were divided with respect to the input-axis illustrated in FIG. 6 for encoding, then the sections are divided with respect to the output-axis for decoding) (operation 1020). Afterwards, a digital signal including the dequantized data, PCM data, in an embodiment of the invention, is generated using the inverse of the conversion used in the encoding operation (operation 1040).

Figure 11:
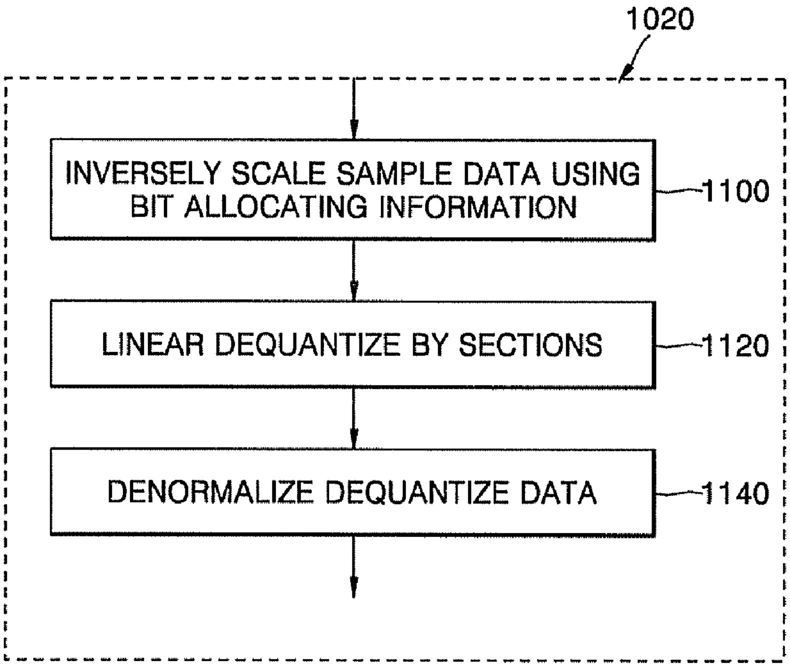
FIG. 11 is a flow chart illustrating a process of dequantizing sample data.

FIG. 11 is a flow chart illustrating the process of dequantizing the sample data (operation 1020). Referring to FIG. 11, the sample data that are linear quantized by sections is scaled inversely to the scaling used for quantization by the inverse scaling unit 900 using the bit allocation information (operation 1110). Afterwards, the data that is inversely scaled by the section linear dequantizing unit 920 is linear dequantized in each section (operation 1120). The dequantized data is then denormalized by the denormalizing unit 940 via the use of an inverse scale factor that corresponds to the scaling factor used for quantization (operation 1140).

Aspects of the present invention may be embodied as computer (including all devices that has information processing functions) readable codes on a computer readable recording medium. The computer readable recording medium is any data storage device that stores data which may be thereafter read by a computer system. Examples of the computer readable recording medium include read-only memory (ROM), random-access memory (RAM), CD-ROMs, magnetic tapes, floppy disks, and optical data storage devices.

The method and apparatus of audio signal encoding using linear quantization by sections according to aspects of the present invention has improved sound quality compared to a general linear quantizing device and has greatly reduced the complexity of a quantizing device in a non-linear quantizing device by considering the distribution of audio data.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of encoding a digital signal, including predetermined side information, using linear quantization by sections, the method comprising:

removing, performed by at least one processing device, redundant information from the digital signal by converting the digital signal;

allocating a number of bits to each predetermined quantized unit of the digital signal in consideration of an importance of the digital signal;

dividing a distribution of the digital signal values into predetermined sections;

linear quantizing data that is divided into the predetermined sections by using a linear function set for each of the sections, the sections divided in consideration of the distribution of digital signal values; and generating a bit stream from the linear quantized data and the predetermined side information.

2. The method of claim 1, wherein the dividing of the distribution of signal values and linear quantizing of the data comprises:

normalizing data converted in the converting of the digital signal using a predetermined scale factor for each of quantized units;

dividing a range of normalized values into predetermined sections, and converting the normalized data using a linear function that is set for each of the predetermined sections;

scaling a value converted in the operation of converting the normalized data using the number of bits allocated to each quantized unit; and calculating a quantized value by rounding the scaled value in the scaling operation.

3. The method according to claim 2, wherein, if the normalized data is not uniformly distributed, a range of the normalized data is divided into predetermined sections.

4. The method of claim 2, wherein the scaling factor is an integer determined by a predetermined function of a value that is greater than or equal to an absolute maximum value after calculating the absolute maximum value among sample data values within the quantized unit.

5. The method of claim 2, wherein the linear function used in the dividing of the range of normalized values is expressed as a plurality of independent linear functions for each predetermined section.

6. The method of claim 5, wherein the dividing of the range of normalized values and the converting of the normalized data comprises:

dividing the range of normalized values into two sections; and converting the normalized data by applying a linear function set for each of the sections to the data, wherein the linear functions are $$y=\alpha x/(\alpha-2b$$

and $$y=x/(1+2b)+2b/(1+2b)$$

(here, a denotes the range of normalized values, and b denotes a section displacement from the center of a).

7. The method of claim 2, wherein the linear function is continuous.

8. The method of claim 1, wherein the converting of the analog signal is performed by one of a discrete cosine transform, a fast Fourier transform, a modified discrete cosine transform, and a subband filter.

9. A computer readable recording medium storing a program to execute the method disclosed in claim 1.

10. The method according to claim 1, wherein the input data is a pulse control modulation (PCM) audio signal.

11. The method according to claim 1, wherein the removal of the redundant information is performed by subband filtering.

12. The method according to claim 1, wherein the importance of the digital signal is based on a psychoacoustic perspective relating to hearing characteristics of humans such that more bits are allocated to frequencies to which humans are highly sensitive.

13. The method according to claim 1, wherein in the allocating of a number of bits to each predetermined quantized unit of the digital signal, detailed information with low sensitivity is omitted using hearing characteristics of humans, a bit allocation amount is set differently for each frequency so as to reduce the encoding amount, and bit allocation information is calculated considering a psychoacoustic perspective.

14. An apparatus to encode a digital signal, including predetermined side information, using linear quantization by sections, the apparatus comprising:

a data converting unit to remove redundant information from the digital signal by converting the digital signal;

a bit allocating unit to calculate a number of bits to be allocated to each predetermined quantizing unit of the digital signal considering an importance of the digital signal;

a linear quantizing unit to divide a distribution of data values into predetermined sections and to linear quantize data that is converted by the data converting unit by using linear function set for each of the sections, the sections divided in consideration of the distribution of digital signal values; and a bit packing unit to generate a bit stream including the linear quantized data generated by the linear quantizing unit and the predetermined side information.

15. The apparatus of claim 14, wherein the linear quantizing unit comprises:

a data normalizing unit to normalize the data converted by the data converting unit using a predetermined scaling factor;

a section quantizing unit to divide a range of normalized values into predetermined sections, and to apply a linear quantizing function set for each of the sections to the normalized data;

a scaling unit to scale values generated by the section quantizing unit using the number of bits allocated by the bit allocation unit; and a rounding unit to generate a quantized value by rounding the scaled value based on the number of allocated bits.

16. The method of claim 14, wherein the converting of the digital signal is performed by one of an inverse discrete cosine transform, a fast Fourier transform, a modified discrete cosine transform, and a subband filter.

17. The apparatus according to claim 14, wherein the input data is a pulse control modulation (PCM) audio signal.

18. The apparatus according to claim 14, wherein the removal of the redundant information is performed by sub-band filtering.

19. The apparatus according to claim 14, wherein the importance of the digital signal is based on a psychoacoustic perspective relating to hearing characteristics of humans such that more bits are allocated to frequencies to which humans are highly sensitive.

* * * * *

UNITED STATES PATENT AND TRADEMARK OFFICE

CERTIFICATE OF CORRECTION

PATENT NO. : 8,149,927 B2
APPLICATION NO. : 12/792048
DATED : April 3, 2012
INVENTOR(S) : Junghoe Kim et al.

It is certified that error appears in the above-identified patent and that said Letters Patent is hereby corrected as shown below:

On the Title Page, Item (57) Col. 2 (Abstract), Line 10, Delete "pin" and insert -- in --, therefor.

In the Claims

In Col. 10, Line 14 (Approx.), In Claim 6, delete "y=ax/(a-2b" and insert -- $y = \frac{ax}{(a-2b)}$ --, therefor.

In Col. 11, Line 10, In Claim 16, delete "The method of claim 14," and insert -- The apparatus of claim 14, --, therefor.

Signed and Sealed this
Twenty-ninth Day of October, 2013

Teresa Stanek Rea
*Deputy Director of the United States Patent and Trademark Office*